(No Model.)
A. N. MATTHEWS.
Steam Piston Packing.
No. 242,346. Patented May 31, 1881.
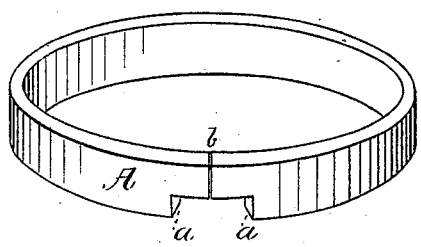
Fig. 1.
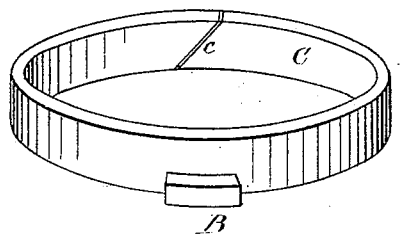 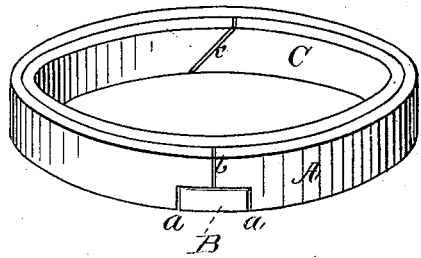
Fig. 2. Fig. 3.
WITNESSES  
Thomas E. Clary  
F. H. Moore
INVENTOR  
A. N. Matthews  
by Jos. H. Adams  
Atty.

UNITED STATES PATENT OFFICE.

ABRAM N. MATTHEWS, OF NORWOOD, MASSACHUSETTS.

STEAM-PISTON PACKING.

SPECIFICATION forming part of Letters Patent No. 242,346, dated May 31, 1881.

Application filed December 17, 1880. (No model.)

*To all whom it may concern:*

Be it known that I, ABRAM N. MATTHEWS, of Norwood, in the county of Norfolk and State of Massachusetts, have invented a new and useful Improvement in Steam-Piston Packing, of which the following is a specification.

The object of my invention is to produce a simple, efficient, and inexpensive steam-piston packing for use in locomotives and in stationary or marine engines.

The invention consists of two metal rings of equal width, the one fitting snugly within the other, the inner ring being provided with a projection which fits in a corresponding recess in the outer ring at the part where the latter is divided, the division being opposite to that of the inner ring. As the outer ring expands and opens the joint the projection on the inner ring is forced by the action of the steam against the bottom of the joint, thus closing it and preventing the passage of steam through the same.

Referring to the drawings, Figure 1 represents the outer ring, showing the recess. Fig. 2 is the inner ring, provided with a projection. Fig. 3 represents the two rings fitted together to form the packing.

A is the outer ring, made with flat upper and lower edges, and having a recess, $a\ a$, on its under side at the divided portion or joint $b$, the said joint being at the center of the recess and at right angles with the plane of the diameter of the ring A.

C represents the inner ring or spring, made to fit snugly within the outer ring, A, the two rings being of equal width at their perimeters. The ring C is divided, as shown at $c$, so as to allow it to expand and contract with the ring A, and on its perimeter at the lower edge is a projection, B, as shown in Fig. 2. The projection B is on a portion of the ring C opposite the division or joint $c$. The ring C is closely fitted within the outer ring, A, as shown in Fig. 3, the projection B on the ring C fitting within the recess $a\ a$, so as to admit of the contraction and expansion of ring A, and the center of the projection B being at the joint or division $b$, as shown. As the steam presses against the steam-face of the packing the projection B will be forced up in the recess against the joint $b$, thus effectually closing the same and preventing the escape of any steam through the packing.

What I claim as my invention, and desire to secure by Letters Patent, is—

In a piston-packing, the combination of an inner ring, C, provided with a projection, B, at a point opposite the division $c$, and an outer ring, A, having a recess, $a\ a$, at its joint or division $b$, as and for the purpose set forth.

In testimony whereof I have signed my name to this specification in the presence of two subscribing witnesses.

A. NAPIER MATTHEWS.

Witnesses:
  J. D. CHICKERING,
  I. R. LAWSON.